US010258023B2

(12) United States Patent
Tucker et al.

(10) Patent No.: US 10,258,023 B2
(45) Date of Patent: Apr. 16, 2019

(54) FISHING LURE FOR SECURING LIVE BAIT (71) Applicants: Brad Tucker, Norwood, NC (US); Thomas Armstrong, Stanfield, NC (US)

(72) Inventors: Brad Tucker, Norwood, NC (US); Thomas Armstrong, Stanfield, NC (US)

(*) Notice: Subject to any disclaimer, the term of this patent is extended or adjusted under 35 U.S.C. 154(b) by 225 days.

(21) Appl. No.: 15/388,012

(22) Filed: Dec. 22, 2016

(65) Prior Publication Data
US 2018/0177170 A1 Jun. 28, 2018

(51) Int. Cl.
A01K 83/06 (2006.01)
A01K 85/00 (2006.01)

(52) U.S. Cl.
CPC ............. A01K 83/06 (2013.01); A01K 85/00 (2013.01)

(58) Field of Classification Search
CPC ................................ A01K 83/06; A01K 85/02
USPC ....... 43/41, 42.22, 42.32, 42.36–42.38, 44.2, 43/44.4, 44.6, 44.8
See application file for complete search history.

(56) References Cited

U.S. PATENT DOCUMENTS

| 2,979,850 | A |   | 4/1961  | Lund |
|-----------|---|---|---------|------|
| 3,105,319 | A |   | 10/1963 | Whalen |
| 3,156,066 | A | * | 11/1964 | Munyer ................. A01K 83/06 43/44.4 |
| 3,398,477 | A |   | 8/1968  | Paluzzi |
| 3,415,004 | A |   | 12/1968 | Whalen |
| 3,541,719 | A |   | 11/1970 | Temple |
| 3,587,189 | A |   | 6/1971  | Kopieko |
| 3,760,529 | A | * | 9/1973  | Hicks ..................... A01K 83/06 43/41 |
| 4,010,568 | A |   | 3/1977  | Mays |
| 4,229,901 | A |   | 10/1980 | Flowers et al. |
| 4,625,451 | A |   | 12/1986 | Griffiths |
| 4,646,464 | A |   | 3/1987  | Wyatt |
| 4,691,467 | A |   | 9/1987  | Brimmer |
| 4,785,571 | A |   | 11/1988 | Beck |
| 4,947,575 | A |   | 8/1990  | Yerkovich |
| 5,617,668 | A | * | 4/1997  | Shimandle ............. A01K 83/06 43/44.2 |
| 6,050,023 | A |   | 4/2000  | Newell |
| 6,665,978 | B1 | * | 12/2003 | Reed ...................... A01K 83/06 43/44.4 |
| 2007/0101633 | A1 | * | 5/2007 | Freburger, Jr. ........ A01K 83/06 43/4 |
| 2007/0180757 | A1 |   | 8/2007 | Kalazich |
| 2016/0100562 | A1 |   | 4/2016 | Souther |
| 2017/0020117 | A1 | * | 1/2017 | Korteweg ............. A01K 85/02 |

* cited by examiner

Primary Examiner — Peter M Poon
Assistant Examiner — Danielle A Clerkley
(74) Attorney, Agent, or Firm — Jeffrey Watson; Mathew Grell; Grell & Watson Patent Attorneys LLC (57) ABSTRACT A fishing lure for securing live bait includes a flexible main body and a stretchable collar. The flexible main body is configured to have a fishing hook inserted therethrough. The stretchable collar is connected to the flexible main body. The stretchable collar has a hole configured to stretch when pulled to allow a live bait to be inserted into the hole and constrict when released to secure the live bait in the hole. Whereby, when the flexible main body is positioned on the fishing hook and the live bait is inserted into the hole of the stretchable collar, the stretchable collar positions the live bait adjacent the fishing hook for fishing.

19 Claims, 7 Drawing Sheets

FISHING LURE FOR SECURING LIVE BAIT

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE DISCLOSURE

Technical Field of the Disclosure

The instant disclosure generally relates to fishing, and lures, tackle, the like, etc. used for fishing. More particularly, the instant disclosure relates to a fishing lure for securing live bait.

Description of the Related Art

It is well known that live bait for fishing is much superior to artificial or dead bait. A major reason for this is that live bait wiggles, squirms and otherwise moves about, thereby attracting fish. Conversely, dead and artificial bait, being motionless except for movement caused by the fisherman or by water currents, do not attract fish nearly as easily. However, the typical method used for securing live bait to a hook is to impale the live bait with the fishing hook. This impaling of the live bait is obviously dangerous to the live bait and typically leads to the bait dying within a short period of time. As such, the fisherman loses the benefit of using the live bait (i.e. the wiggling, squirming, movement, etc.) that attracts the fish quickly, and has to rebait often, thus requiring more live bait.

As such, there is clearly a need to provide a device and/or method that can be used for fishing with live bait that keeps the live bait alive longer, like by not having to impale the live bait with the fishing hook. In addition, it should be readily apparent that the device and/or method should allow the live bait to move freely to provide the wiggling, squirming, movement, etc. that attracts the fish.

A number of devices are presently known that attempt to hold earthworms and/or other live bait. Of these devices, those shown in U.S. Pat. Nos. 2,115,493 and 2,454,879 hold an earthworm in a plurality of places, such that very little fish attracting movement is permitted, not to mention the fact that the worm is held by steel wire which tends to cut into the worm, thereby killing it prematurely. U.S. Pat. No. 2,559,409 shows a device that holds a worm between the shanks of three connected hooks. It, too, tends to cut into the worm when sufficient force is applied to the shanks to retain a wiggly worm in position. U.S. Pat. No. 2,982,049 shows a device that is intended to hold live bait by means of a slip-noose of fine wire. Obviously, a fine wire slip-noose tight enough to hold a wriggling earthworm will also cut into the worm, thus rendering it lifeless and unappealing to fish. U.S. Pat. No. 4,947,575 discloses a bait holder for holding live bait on a fishhook that includes a concave saddle member and a strap-like retaining member that is positioned over the bait to retain it in place. However, this bait holder has been found to be difficult to operate and does not function to hold the live bait on the hook with free movement.

It is a primary object of the present disclosure to provide a lure for fishing hooks that retains live bait without impaling it, or otherwise harming it, and permits the live bait to freely move about in order to more readily attract fish.

It is another object of the present disclosure to provide a simple and easy to use fishing lure for securing live bait.

The instant disclosure of a fishing lure for securing live bait is designed to address at least some aspects of the problems discussed above.

SUMMARY

Briefly described, in a possibly preferred embodiment, the present disclosure overcomes the above-mentioned disadvantages and meets the recognized need for such a device by providing a fishing lure for securing live bait. The fishing lure for securing live bait generally includes a flexible main body and a stretchable collar. The flexible main body is configured to have a fishing hook inserted therethrough. The stretchable collar is connected to the flexible main body. The stretchable collar has a hole configured to stretch when pulled to allow a live bait to be inserted into the hole, and constrict when released, to secure the live bait in the hole. Whereby, when the flexible main body is positioned on the fishing hook and the live bait is inserted into the hole of the stretchable collar, the stretchable collar positions the live bait adjacent the fishing hook for fishing.

One feature of the instant fishing lure for securing live bait may be that the flexible main body may be configured to be pierced by a barb of a fishing hook and moved around a bend of the fishing hook and onto a shank of the fishing hook. Whereby, when the flexible main body is positioned on the shank of the fishing hook and the live bait is inserted into the hole of the stretchable collar, the stretchable collar may position the live bait adjacent the shank of the fishing hook for fishing.

Another feature of the instant disclosure of a fishing lure for securing live bait may be that the flexible main body may have a substantially cylinder shape. The substantially cylinder shape of the flexible main body may be configured to be pierced by the barb of the fishing hook at an end and moved around the bend of the fishing hook and onto the shank of the fishing hook. Whereby, the substantially cylinder shape of the flexible main body may be positioned on the shank of the fishing hook longitudinally.

In select embodiments of the fishing lure for securing live bait, the stretchable collar may include a top gripping portion. The top gripping portion may be positioned on an opposite end of the stretchable collar from the flexible main body. The top gripping portion may be configured to be pulled for stretching the hole for inserting and removing the live bait. In select embodiments, the top gripping portion may include an angled top, wherein the angled top may include an acute angle.

In select embodiments of the fishing lure for securing live bait, the stretchable collar may include a side gripping portion on one side, or two side gripping portions, one on each side of the stretchable collar. The side gripping portion(s) may be configured to be pulled for stretching the hole for inserting and removing the live bait. In select embodiments, each of the side gripping portions may include an angled side, wherein the angled side may including an obtuse angle.

In select embodiments of the fishing lure for securing live bait, the stretchable collar may include a substantially diamond shape. The substantially diamond shape may include a top gripping portion at one end of the substantially diamond shape, and the flexible main body positioned at the other end of the substantially diamond shape. A first side gripping portion may be on a first side of the substantially diamond shape, and a second side gripping portion may be on a second side of the substantially diamond shape.

Another feature of the instant fishing lure for securing live bait may be that the stretchable collar can include a thickness. The thickness of the stretchable collar may be configured to provide rigidity to the stretchable collar. In select embodiments, the thickness of the stretchable collar may be configured to maintain the stretchable collar perpendicular to the flexible main body during operation. In other select embodiments, the thickness of the stretchable collar may be configured for providing a desired strength for constricting the live bait in the hole of the stretchable collar.

Another feature of the instant disclosure of a fishing lure for securing live bait may be that the flexible main body and the stretchable collar may be integrally formed. In select embodiments, the flexible main body and the stretchable collar may be integrally formed from a plastisol material.

In select embodiments, the stretchable collar of the fishing lure for securing live bait may be configured to hold various types of live bait, including, but not limited to, a minnow, a cricket, a worm, the like, other live baits, and/or combinations thereof.

In other select embodiments, the flexible main body of the fishing lure for securing live bait may include a buoyant insert. The buoyant insert may be positioned inside the flexible main body of the fishing lure. The buoyant insert may be configured to maintain the fishing lure on top of the water during fishing with the live bait, i.e. the fishing lure becomes a topwater lure. In select embodiments, the buoyant insert may be an expanded polystyrene foam material (e.g. Styrofoam®). In these buoyant or topwater embodiments of the fishing lure for securing live bait, the live bait may be a cricket. Whereby, the buoyant insert positioned inside the flexible main body may be configured to maintain the cricket on top of the water during use (i.e. fishing).

In other select embodiments, the fishing lure for securing live bait may include at least two of the stretchable collars connected to the flexible main body. These multi-stretchable collar embodiments may include, but are not limited to, just two of the stretchable collars connected to the flexible main body: a first stretchable collar and a second stretchable collar. The first stretchable collar may be connected to the flexible main body and may have a first hole configured to stretch when pulled to allow a live bait to be inserted into the first hole and constrict when released to secure the live bait in the first hole. The second stretchable collar may be connected to the flexible main body and may have a second hole configured to stretch when pulled to allow a live bait to be inserted into the second hole and constrict when released to secure the live bait in the second hole. Whereby, when the flexible main body may be positioned on the fishing hook and the live bait is inserted into the first hole of the first stretchable collar and the second hole of the second stretchable collar, the first and second stretchable collars may position the live bait adjacent the fishing hook for fishing. In select embodiments, the first stretchable collar may be spaced apart from the second stretchable collar, where the first hole of the first stretchable collar may be aligned with the second hole of the second stretchable collar. In select embodiments, the live bait may be a worm, whereby a first portion of the worm may be held by the first hole of the first stretchable collar, and a second portion of the worm may be held by the second hole of the second stretchable collar.

In another aspect, the instant disclosure embraces a fishing lure for securing live bait in a buoyant or topwater configuration. In this buoyant or topwater configuration, the fishing lure for securing live bait may generally include the flexible main body with a buoyant insert positioned inside, and the stretchable collar. The flexible main body may be configured to have the fishing hook inserted therethrough. The stretchable collar may be connected to the flexible main body. The stretchable collar may have the hole configured to stretch when pulled to allow a live bait to be inserted into the hole, and constrict when released, to secure the live bait in the hole. Whereby, when the flexible main body is positioned on the fishing hook and the live bait is inserted into the hole of the stretchable collar, the stretchable collar may position the live bait adjacent the fishing hook for fishing and the buoyant insert may maintain the fishing lure on top of the water during fishing with the live bait.

One feature of this buoyant or topwater embodiment of the fishing lure for securing live bait may be that the buoyant insert may be, but is not limited to, an expanded polystyrene foam material (e.g. Styrofoam®).

In select embodiments of this buoyant or topwater embodiment of the fishing lure for securing live bait, the live bait may be a cricket. Whereby, the buoyant insert positioned inside the flexible main body may be configured to maintain the cricket on top of the water during fishing.

In another aspect, the instant disclosure embraces a fishing lure for securing live bait in a double stretchable collar embodiment. In this double stretchable collar embodiment, the fishing lure for securing live bait may generally include a flexible main body and two stretchable collars: a first stretchable collar and a second stretchable collar. The flexible main body may be configured to have a fishing hook inserted therethrough. The first stretchable collar may be connected to the flexible main body and may have a first hole configured to stretch when pulled to allow a live bait to be inserted into the first hole, and constrict when released, to secure a first portion of the live bait in the first hole. The second stretchable collar may be connected to the flexible main body and may have a second hole configured to stretch when pulled to allow a live bait to be inserted into the second hole, and constrict when released, to secure a second portion of the live bait in the second hole. Whereby, when the flexible main body is positioned on the fishing hook and the live bait is inserted into the first hole of the first stretchable collar and the second hole of the second stretchable collar, the first and second stretchable collars may position the live bait adjacent the fishing hook for fishing.

In select embodiments of the double stretchable collar configuration of the fishing lure for securing live bait, the first stretchable collar may be spaced apart from the second stretchable collar, where the first hole of the first stretchable collar may be aligned with the second hole of the second stretchable collar.

In select embodiments of this double stretchable collar embodiment of the fishing lure for securing live bait, the live bait may be a worm. Whereby, the first portion of the worm may be held by the first hole of the first stretchable collar, and the second portion of the worm may be held by the second hole of the second stretchable collar.

BRIEF DESCRIPTION OF THE DRAWINGS

The present apparatuses, systems and methods will be better understood by reading the Detailed Description with reference to the accompanying drawings, which are not necessarily drawn to scale, and in which like reference numerals denote similar structure and refer to like elements throughout, and in which:

FIG. 7b is a schematic perspective view of the fishing lure from FIG. 5 illustrating an embodiment of how to insert the worm into the second hole of the second stretchable collar of the fishing lure once inserted through the first hole of the first stretchable collar of the fishing lure, as shown in FIG. 7a.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in FIGS. 1-7, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to FIGS. 1-7 by way of example, and not limitation, therein is illustrated example embodiments of fishing lure 10 for securing live bait 12. Fishing lure 10 may be for securing any live bait 12, including, but not limited to, crickets 66, minnows 64, worms 68 (e.g. earthworms, bloodworms, nightcrawlers, etc.), the like, other live bait, etc. Fishing lure 10 may secure the live bait 12 for fishing with minimal or no harm to live bait 12, including without having to impale live bait 12 with fishing hook 16. In addition, fishing lure 10 may allow live bait 12 to move freely with minimal constraints, thus, allowing live bait 12 to wiggle, squirm, swim, an otherwise move about for attracting fish. Furthermore, fishing lure 10 may be simple and easy to operate. Fishing lure 10 for securing live bait 12 may generally include flexible main body 14 and at least one stretchable collar 18. These parts will be described in greater detail below.

Flexible main body 14 may be included in fishing lure 10 for securing live bait 12. See FIGS. 1-7. Flexible main body 14 may be for providing a main portion of fishing lure 10 that may allow fishing hook 16 to be inserted therethrough for positioning fishing lure 10 on fishing hook 16. Flexible main body 14 may be flexible for allowing it to be impaled by barb 22 of fishing hook 16 and rotated around bend 24 onto shank 26 of fishing hook 16. As such, flexible main body 14 may be configured to have fishing hook 16 inserted therethrough. As shown in the Figures substantially cylinder shape 28. Substantially cylinder shape 28 of flexible main body 14 may be configured to be pierced by barb 22 of fishing hook 16 at end 30 (or its other end) and moved around bend 24 of fishing hook 16 and onto shank 26 of fishing hook 16. This substantially cylinder shape 28 of flexible main body 14 may allow it to be positioned longitudinally on shank 26 of fishing hook 16 with minimal obstruction to barb 22 of fishing hook 16.

Stretchable collar 18 may be included in fishing lure 10 for securing live bait 12. See FIGS. 1-7. Stretchable collar 18, or a plurality of stretchable collars 18 may be included in fishing lure 10 for securing live bait 12 on fishing lure 10. Stretchable collar 18 may be connected to main body 14. Stretchable collar 18 may be connected to flexible main body 14 by any means, including any bonding, adhesives, mechanical fasteners, the like, etc. In select embodiments, stretchable collar 18 may be connected to flexible main body 14 by being integrally formed with flexible main body 14. Stretchable collar 18 may have hole 20 therein. Hole 20 in stretchable collar 18 may be configured to stretch when pulled (see FIGS. 3b, 7a and 7b) to allow live bait 12 to be inserted into hole 20. Once live bait 12 is inserted into hole 20 and stretchable collar 18 is released, hole 20 may be configured to constrict to secure live bait 12 in hole 20. As such, hole 20 may be sized smaller than the desired size of live bait 12.

When flexible main body 14 is positioned on fishing hook 16 and live bait 12 is inserted into hole 20 of stretchable collar 18, stretchable collar 18 positions live bait 12 adjacent fishing hook 16 for fishing. See FIGS. 3b, 4, 6 and 7b. As shown in the Figures, flexible main body 14 may be configured to be pierced by barb 22 of fishing hook 16 and moved around bend 24 of fishing hook 16 and onto shank 26 of fishing hook 16. Whereby, when flexible main body 14 is positioned on shank 26 of fishing hook 16 and live bait 12 is inserted into hole 20 of stretchable collar 18, stretchable collar 18 may position live bait 12 adjacent shank 26 of fishing hook 16 for use, i.e. fishing.

Top gripping portion 32 may be included on each stretchable collar 18 of fishing lure 10. See FIGS. 1-7. Top gripping portion 32 may be for providing a primary area for the user to grip stretchable collar 18 to stretch it and open hole 20 for inserting live bait 12. Top gripping portion 32 may be positioned on opposite end 34 of stretchable collar 18 from flexible main body 14. This may allow the user to hold flexible main body 14, and/or fishing hook 16 inserted therethrough, for stretching hole 20 by pulling top gripping portion 32. As such, top gripping portion 32 may be configured to be pulled for stretching hole 20 for inserting and removing live bait 12. Top gripping portion 32 may include any desired size and/or shape. In select embodiments, as shown in the Figures, top gripping portion 32 may include angled top 36. Angled top 36 may include any angle, including but not limited to, acute angle 38, as shown in the Figures. This acute angle 38 of angled top 36 of top gripping portion 32, may provide for the necessary main gripping area on the top of stretchable collar 18.

Side gripping portion 40 or side gripping portions 40 may be included on each stretchable collar 18 of fishing lure 10. See FIGS. 1-7. Stretchable collar 18 may include side gripping portion 40 on one side, or two side gripping portions 40 of two or both sides of stretchable collar 18. Side gripping portions 40 may be for providing a secondary area or areas for the user to grip the stretchable collar 18 to stretch it and open hole 20 for inserting live bait 12. These secondary areas provided by side gripping portions 40 may be utilized for aiding in inserting live bait 12 and/or for adjusting the position of live bait 12 inside hole 20 of stretchable collar 18. As such, side gripping portion(s) 40 may be configured to be pulled for stretching hole 20 for inserting and removing live bait 12, and/or adjusting live bait 12. Side gripping portion(s) 40 may include any desired size and/or shape. In select embodiments, each of the side gripping portions 40 may include angled side 46. Angled side 46 may include any angle, including but not limited to, obtuse angle 48, as shown in the Figures. This obtuse angle 48 of angled side 46 of each side gripping portion 40, may provide for a secondary gripping area on the sides of stretchable collar 18.

In select embodiments of fishing lure 10 for securing live bait, stretchable collar 18 may include substantially diamond shape 50, as shown in the Figures. However, the disclosure is not so limited, and other various shapes and sizes may be provided as desired. Substantially diamond shape 50 may include top gripping portion 32 at one end 52 of substantially diamond shape 50, and flexible main body 14 positioned at other end 54 of substantially diamond shape 50. First side gripping portion 56 may be on first side 57 of substantially diamond shape 50, and second side gripping portion 58 may be on second side 59 of substantially diamond shape 50. As such, substantially diamond shape 50 may provide a primary gripping area at top gripping portion 32 and two secondary gripping areas at first and second gripping portions 56 and 58 for pulling and stretching stretchable collar 18 for inserting, removing, adjusting, and otherwise manipulating live bait 12 in and out of hole 20. Substantially diamond shape 50 may also provide a unique looking design that may mimic parts of live bait 12 and/or its surrounding environment.

Thickness 60 of stretchable collar 18 may be included with fishing lure 10 for securing live bait 12. See FIGS. 1, 2, 4, 5 and 6. Thickness 60 of stretchable collar 18 may be configured to provide rigidity to stretchable collar 18. In select embodiments, thickness 60 of stretchable collar 18 may be configured to maintain stretchable collar 18 perpendicular to flexible main body 14 during operation. This rigidity provided by thickness 60 may still be flexible for allowing stretchable collar 18 to bend relative to flexible main body 14 when pressure is asserted, but when no pressure is asserted, the rigidity provided by thickness 60 may maintain stretchable collar 18 perpendicular to flexible main body 14. In other select embodiments, thickness 60 of stretchable collar 18 may be configured for providing a desired strength for constricting live bait 12 in hole 20 of stretchable collar 18. As such, thickness 60 along with the strength of stretchable material used for making stretchable collar 18, may be adjusted for providing the desired strength of compression on live bait 12 provided by hole 20.

As shown in the Figures, another feature of the instant disclosure of fishing lure 10 for securing live bait 12 may be that flexible main body 14 and stretchable collar 18 (or multiple stretchable collars 18) may be integrally formed. Integrally formed may mean that flexible main body 14 and stretchable collar(s) 18 may be formed together in a single process, like a mold, the like, etc. Flexible main body 14 and stretchable collar(s) 18 may be integrally formed from any material or by any process. In select embodiments, flexible main body 14 and stretchable collar(s) 18 may be integrally formed from plastisol material 62. Plastisol material 62 may be a suspension of PVC particles in a liquid plasticizer used to form fishing lure 10. Plastisol material 62 may be characterized in that it flows as a liquid and can be poured into a heated mold, whereby, when heated to around 177 degrees C., the plastic and plasticizer may mutually dissolve each other. On cooling the mold below 60 degrees C., a flexible, permanently plasticized solid product may result. Plastisol material 62 may be used to create fishing lure 10 by any means, including any slush molding or slush casting (a form of spin casting that is more complex than relatively simple resin casting, but less expensive and less sophisticated than the injection molding used for most plastic products). Plastisol material 62 may be used to create fishing lure 10 with metal molds that are filled with liquid plastisol. For example, when the open mold cavities are filled, the mold may be spun on a heavy duty, high speed centrifuge to force the liquid vinyl into all of the fine detail on the interior of the mold. Then the metal mold may be placed into a heating solution, usually an industrial salt heated to about 204° C. (400° F.). The liquid vinyl may cook for a few seconds. The mold may then be removed from the heating solution and the remaining liquid may be poured out. This leaves a thin skin of vinyl on the interior of the metal mold. The mold may then be placed back into the heating solution for three to four minutes to cure. After curing, the mold may again be removed from the heating solution, cooled with water, and placed on a rack. While the vinyl part is still warm in the mold, it may be very flexible and can be removed from the mold with pliers. When the parts cool, they become rigid and may be ready.

Figure 1:
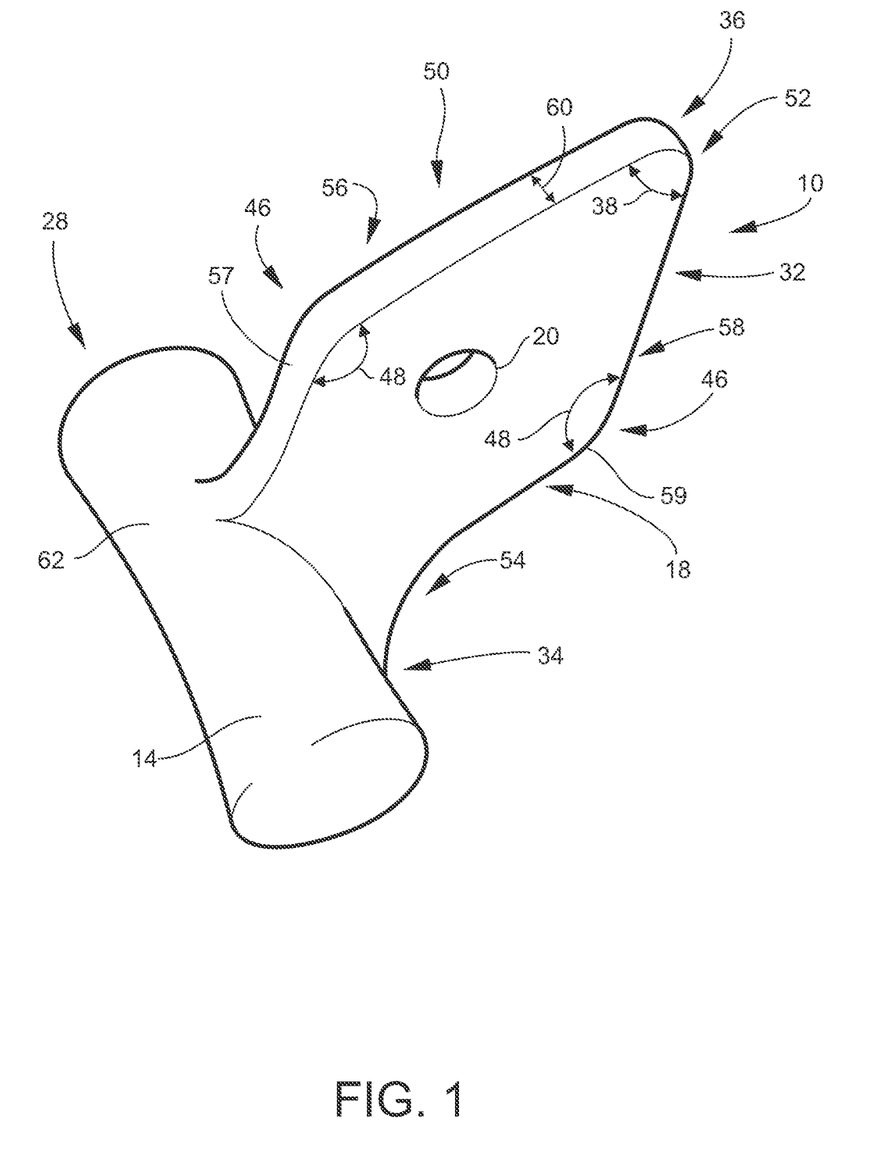
FIG. 1 is a schematic perspective view of the fishing lure for securing live bait according to select embodiments of the instant disclosure.
Figure 2:
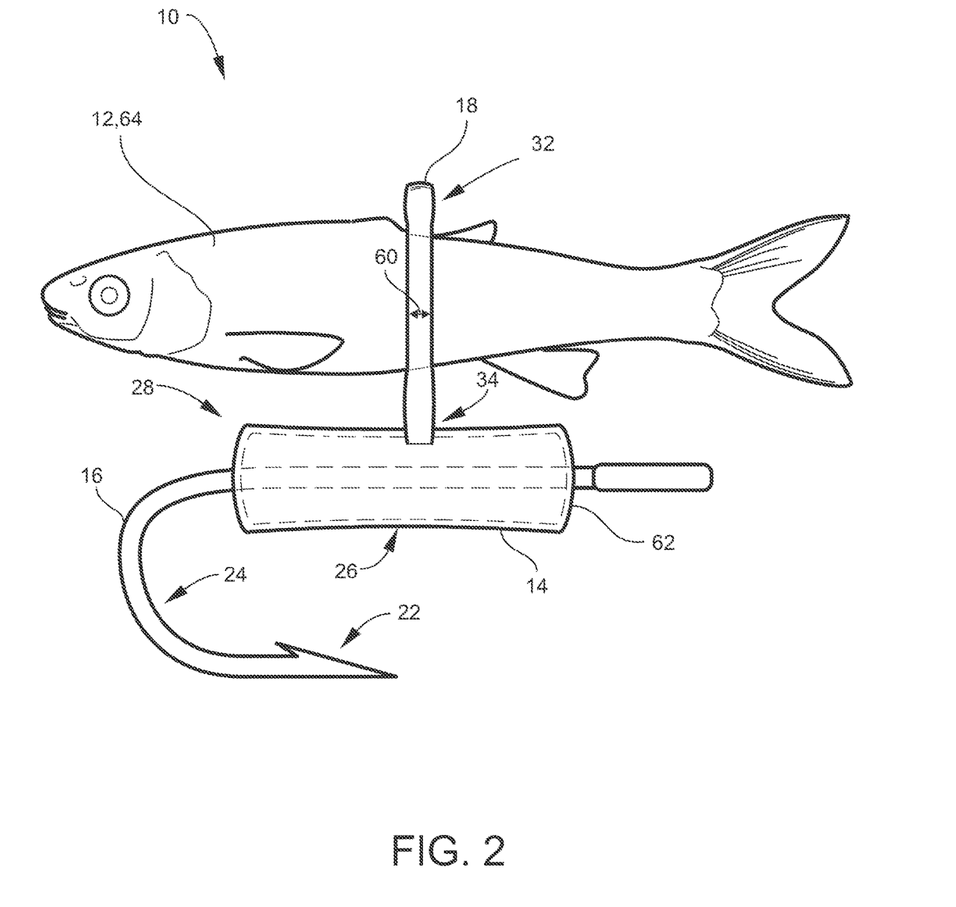
FIG. 2 is a schematic side view of the fishing lure for securing live bait from FIG. 1 with a hook inserted through the flexible main body and a minnow attached to the lure through the hole of the stretchable collar.
Figures 3A, 3B:
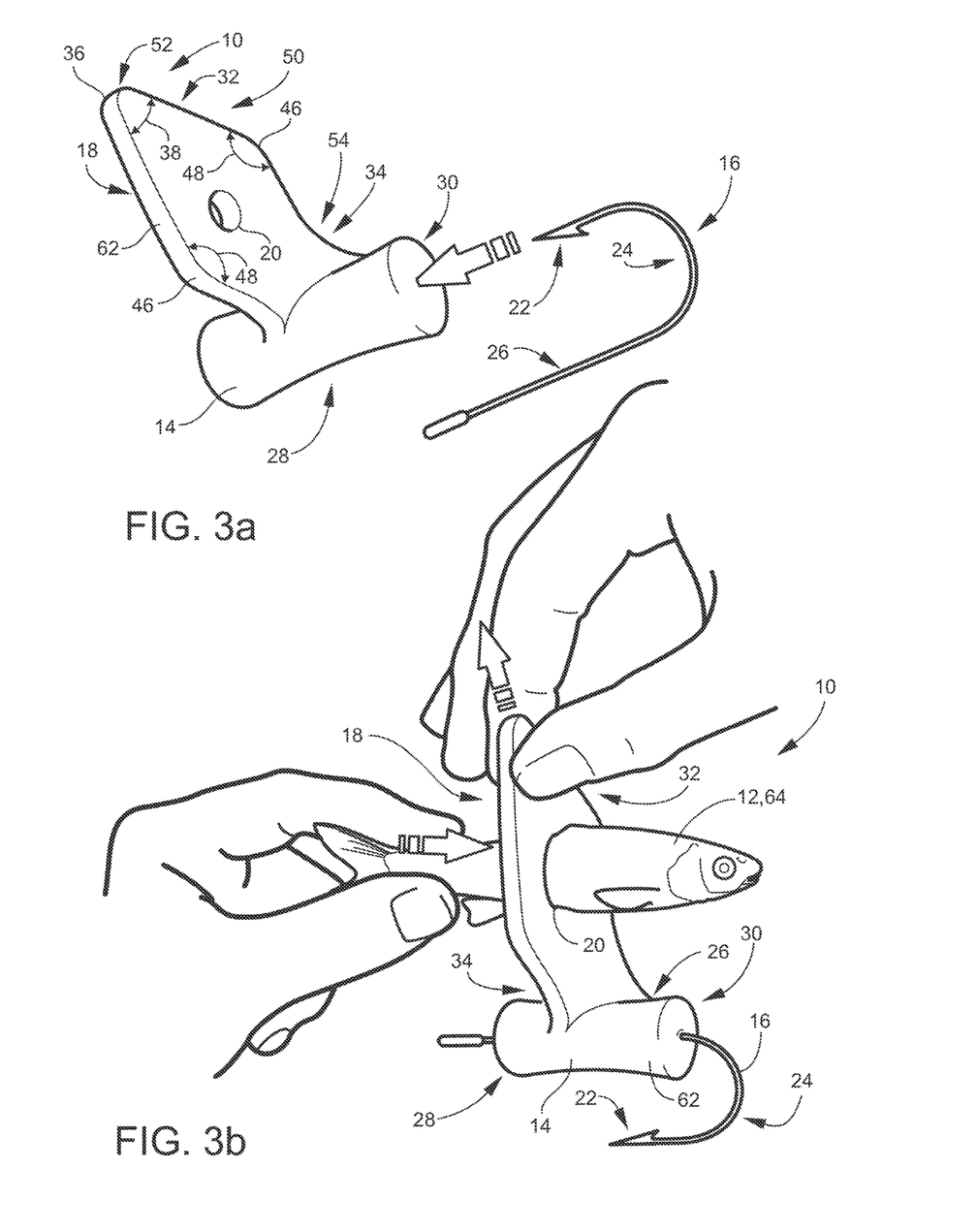
FIG. 3a is a schematic perspective view of the fishing lure from FIG. 1 illustrating an embodiment of how to insert the fishing hook into the flexible main body of the fishing lure.
FIG. 3b is a schematic perspective view of the fishing lure from FIG. 1 illustrating an embodiment of how to insert the live bait (like a minnow, as shown) into the hole of the stretchable collar.
Figure 4:
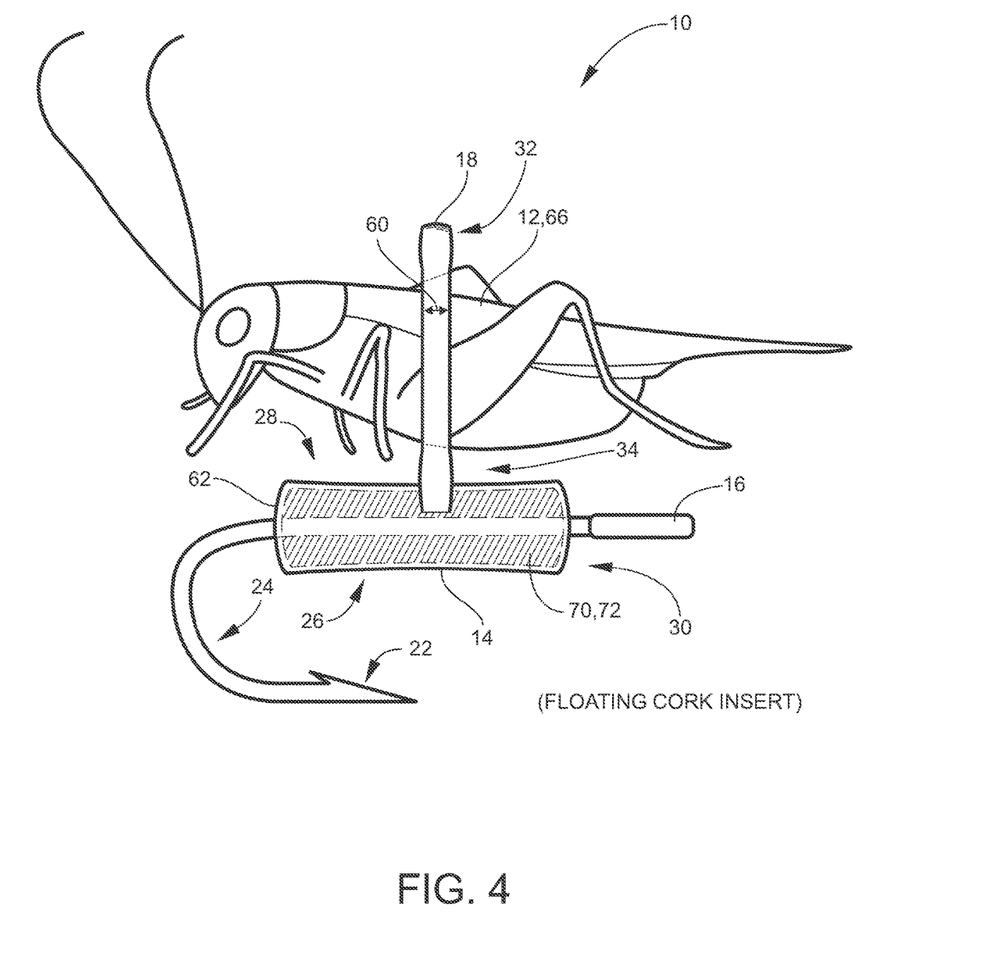
FIG. 4 is a schematic side view of the fishing lure for securing live bait with a buoyant insert inside the flexible main body according to select embodiments of the instant disclosure with a hook inserted through the flexible main body of the fishing lure and a cricket attached to the lure through the hole in the stretchable collar.

Referring now specifically to FIG. 4, in other select embodiments of fishing lure 10 for securing live bait, flexible main body 14 may include buoyant insert 70, Buoyant insert 70 may be for making fishing lure 10 buoyant or a topwater fishing lure designed to keep live bait 12 on top of the water. In select embodiments, as shown in FIG. 4, buoyant insert 70 may be positioned inside flexible main body 14 of fishing lure 10. As such, buoyant insert 70 may be configured to maintain flexible main body 14 on top of the water during fishing with live bait 12, i.e. fishing lure 10 becomes a topwater lure. Buoyant insert 70 may be any buoyant or floatable material capable of keeping fishing lure 10 on top of the water during use. In select embodiments, buoyant insert 70 may be an expanded polystyrene foam material 72 (e.g. Styrofoam®). In these buoyant or topwater embodiments of fishing lure 10 for securing live bait 12, live bait 12 may be cricket 66, as shown in FIG. 4, or any other live bait that is desired to be used as a topwater lure. Whereby, buoyant insert 70 positioned inside flexible main body 14 may be configured to maintain cricket 66 (or other live bait 12 desired to stay on top of the water during fishing) on top of the water during use (i.e. fishing).

Figure 5:
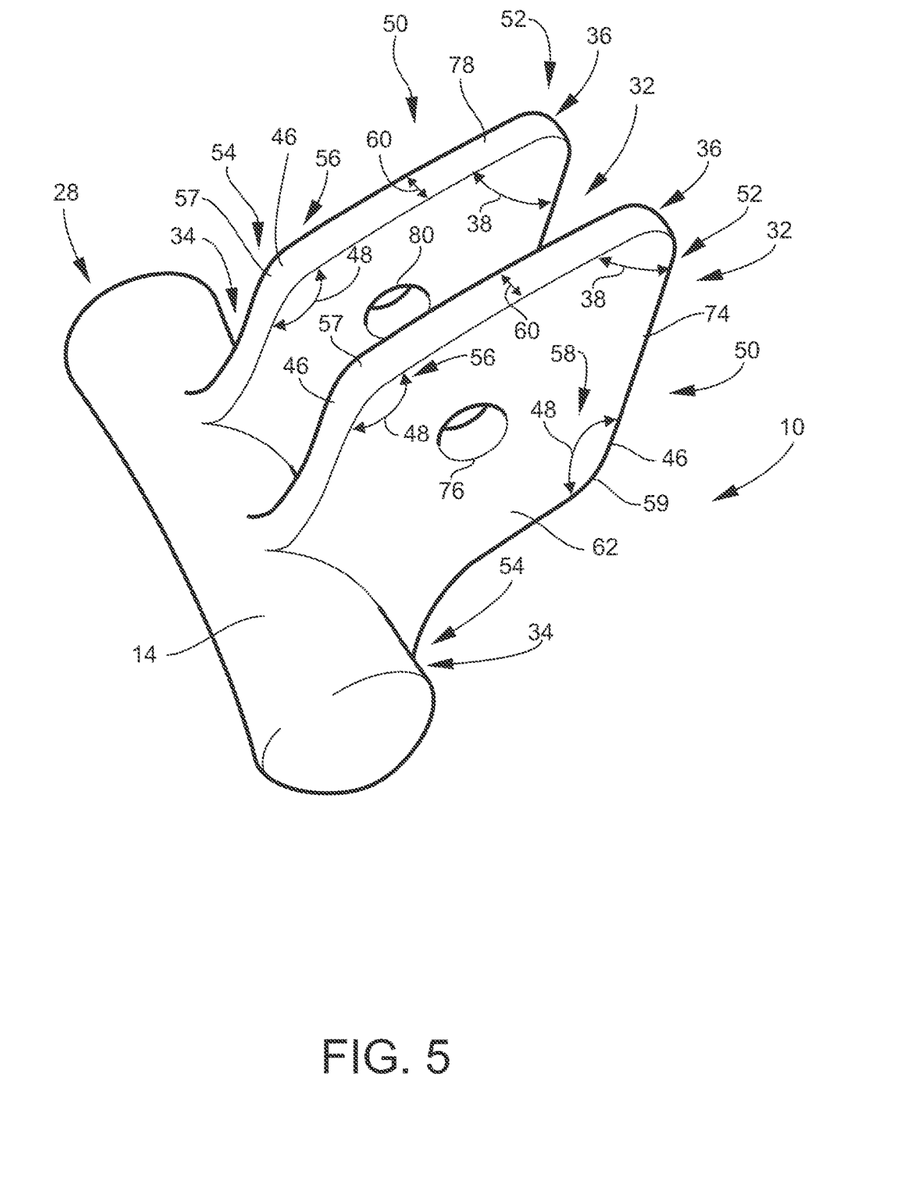
FIG. 5 is a schematic perspective view of the fishing lure for securing live bait according to select embodiments of the instant disclosure with two stretchable collars, i.e. a double stretchable collar embodiment.
Figure 6:
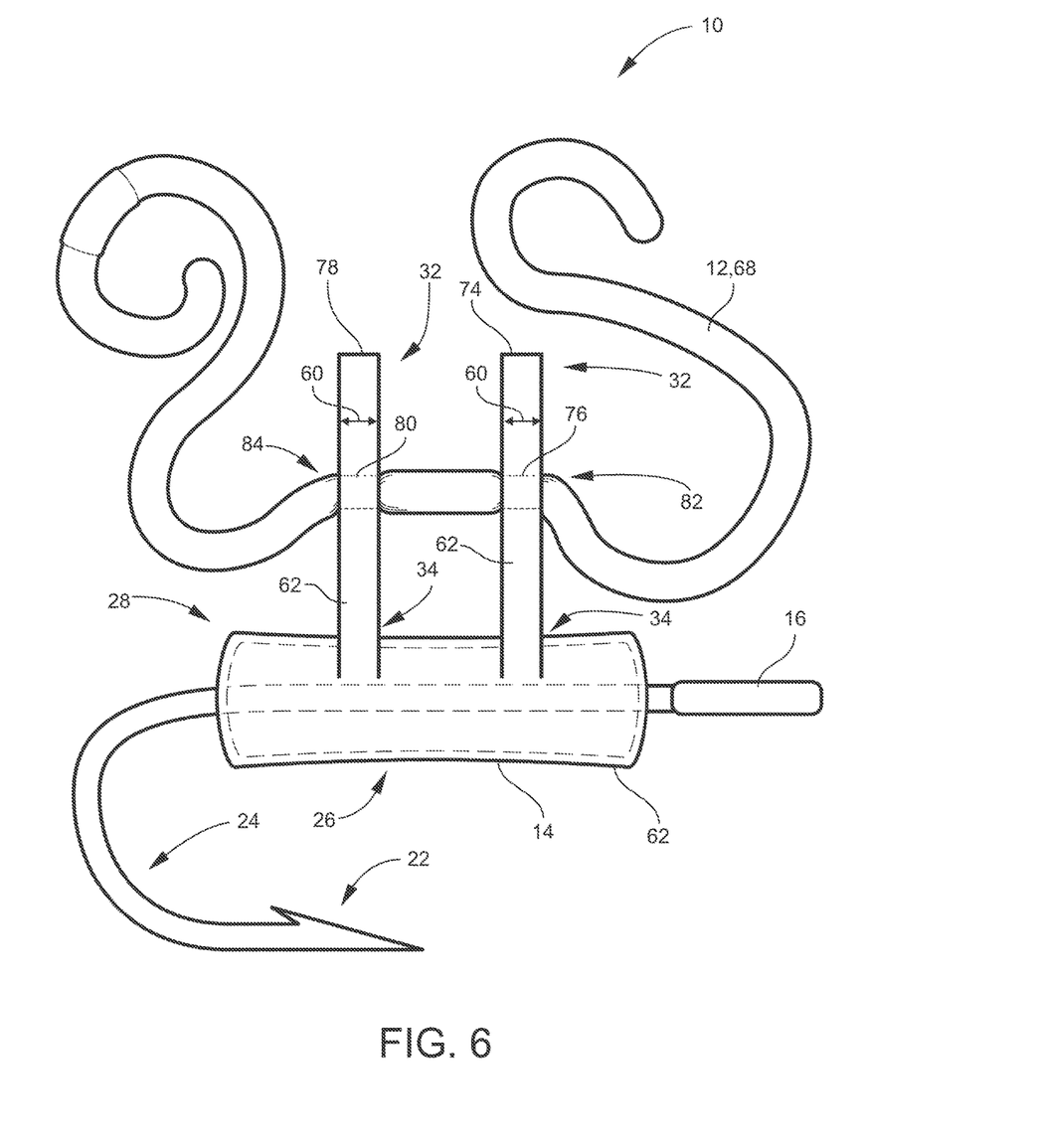
FIG. 6 is a schematic side view of the fishing lure for securing live bait from FIG. 5 with a hook inserted through the flexible main body of the fishing lure and a worm attached to the lure through each hole of the two stretchable collars.
Figure 7A:
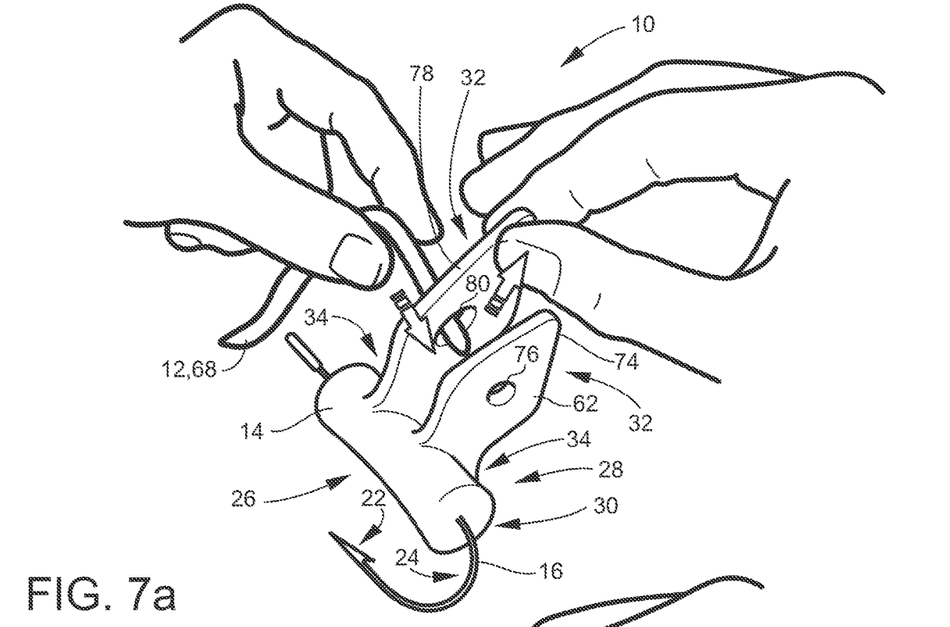
FIG. 7a is a schematic perspective view of the fishing lure from FIG. 5 illustrating an embodiment of how to insert the worm into the first hole of the first stretchable collar of the fishing lure.
Figure 7B:
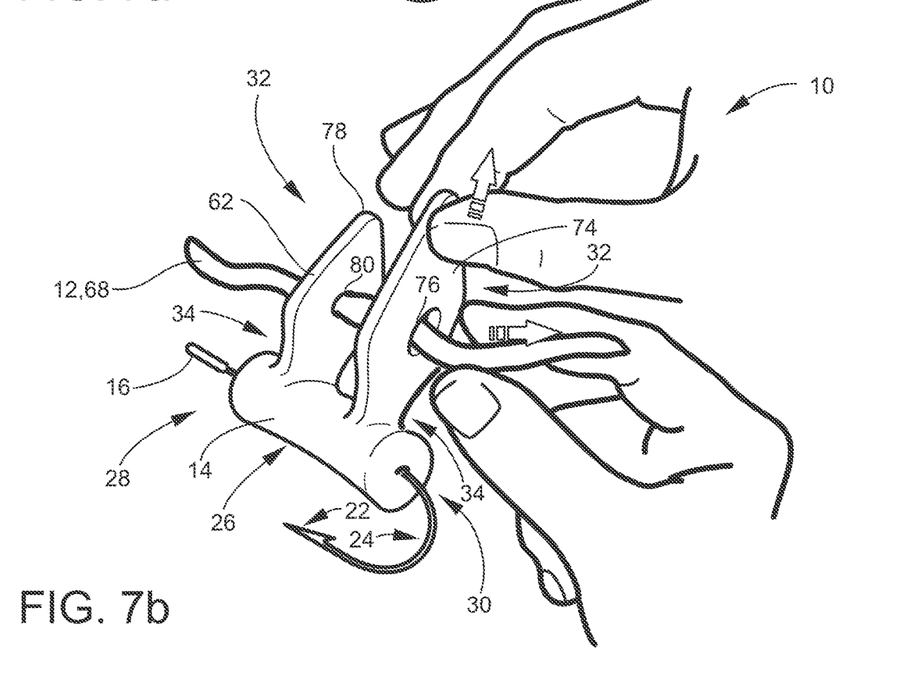

Referring now to the specific embodiments shown in FIGS. 5-7, in other select embodiments, fishing lure 10 for securing live bait 12 may include at least two stretchable collars 18 connected to flexible main body 14. These multi-stretchable collar 18 embodiments may include, but are not limited to, just two stretchable collars 18 connected to flexible main body 14: first stretchable collar 74 and second stretchable collar 78. First stretchable collar 74 may be connected to flexible main body 14 and may have first hole 76 configured to stretch when pulled to allow live bait 12 to be inserted into first hole 76 and constrict when released to secure live bait 12 in first hole 76. Second stretchable collar 78 may be connected to flexible main body 14 and may have second hole 80 configured to stretch when pulled to allow live bait 12 to be inserted into second hole 80 and constrict when released to secure live bait 12 in second hole 80. Whereby, when flexible main body 14 may be positioned on fishing hook 16 and live bait 12 is inserted into first hole 76 of first stretchable collar 74 and second hole 80 of second stretchable collar 78, first and second stretchable collars 74 and 78 may position live bait 12 adjacent fishing hook 16 for fishing. First and second stretchable collars 74 and 78 may be positioned at any various locations on flexible main body 14. In select embodiments, first stretchable collar 74 may be spaced apart from second stretchable collar 78, where first hole 76 of first stretchable collar 74 may be aligned with second hole 80 of second stretchable collar 78. This aligned embodiment may be preferred for positioning live bait 12 longitudinally about fishing hook 16. In select embodiments, as shown in FIGS. 6 and 7, live bait 12 may be worm 68. Whereby, first portion 82 of worm 68 may be held by first hole 76 of first stretchable collar 74, and second portion 84 of worm 68 may be held by second hole 80 of second stretchable collar 78 (or vice versa).

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

What is claimed is:

1. A fishing lure for securing a live bait comprising:
 a flexible main body configured to retain a fishing hook inserted therethrough; and
 a stretchable collar connected to said flexible main body;
 said stretchable collar having a hole configured to stretch when pulled to allow the live bait to be inserted into said hole and constrict when released to secure said live bait in said hole;
 wherein said stretchable collar includes a top gripping portion on an opposite end of the stretchable collar from the flexible main body, where the hole of the stretchable collar is positioned between the top gripping portion and the flexible main body, said top gripping portion is configured to be pulled for stretching the hole for inserting and removing the live bait;
 whereby, when said flexible main body is positioned on the fishing hook and the live bait is inserted into the hole of the stretchable collar, said stretchable collar positioning the live bait adjacent the fishing hook for fishing.

2. The fishing lure of claim 1, wherein said flexible main body having a substantially cylinder shape, wherein said substantially cylinder shape of the flexible main body is configured to be pierced by a barb of a fishing hook at an end and moved around a bend of the fishing hook and onto a shank of the fishing hook, whereby, said substantially cylinder shape of the flexible main body is positioned on the shank of the fishing hook longitudinally, where the substantially cylinder shape of the flexible main body has a length sized to cover the majority of the shank of the fishing hook.

3. The fishing lure of claim 1, wherein said top gripping portion including an angled top, wherein said angled top including an acute angle.

4. The fishing lure of claim 1, wherein said stretchable collar includes a side gripping portion on a side of the hole, or two side gripping portions on each side of the hole, each of the side gripping portions are configured to be pulled for stretching the hole for inserting and removing the live bait, each of the side gripping portions include an angled side, wherein said angled side including an obtuse angle.

5. The fishing lure of claim 1, wherein said stretchable collar includes a substantially diamond shape including:
 a top gripping portion at one end of the substantially diamond shape;
 the flexible main body positioned at an other end of the substantially diamond shape;
 a first side gripping portion on a first side of the substantially diamond shape; and
 a second side gripping portion on a second side of the substantially diamond shape.

6. The fishing lure of claim 1, wherein said stretchable collar includes a thickness, said thickness being configured to provide rigidity to the stretchable collar to maintain the stretchable collar perpendicular to the flexible main body and to provide a desired strength for constricting the live bait in the hole of the stretchable collar.

7. The fishing lure of claim 1, wherein the flexible main body and the stretchable collar are integrally formed from a plastisol material.

8. The fishing lure of claim 1, wherein the stretchable collar is configured to hold the live bait selected from a group consisting of: a minnow, a cricket, and a worm.

9. The fishing lure of claim 1, wherein the flexible main body including a buoyant insert positioned inside the flexible main body, said buoyant insert being configured to maintain the fishing lure on top of water during fishing with the live bait, wherein the buoyant insert is an expanded polystyrene foam material.

10. The fishing lure of claim 9, wherein the live bait is a cricket, whereby the buoyant insert positioned inside the flexible main body is configured to maintain the cricket on top of the water during fishing.

11. The fishing lure of claim 1 comprising two or more of said stretchable collars connected to said flexible main body, said two or more of said stretchable collars including at least:
- a first stretchable collar connected to said flexible main body having a first hole configured to stretch when pulled to allow a live bait to be inserted into said first hole and constrict when released to secure said live bait in said hole; and
- a second stretchable collar connected to said flexible main body having a second hole configured to stretch when pulled to allow a live bait to be inserted into said second hole and constrict when released to secure said live bait in said second hole;
- whereby, when said flexible main body is positioned on the fishing hook and the live bait is inserted into the first hole of the first stretchable collar and the second hole of the second stretchable collar, said first and second stretchable collars positioning the live bait adjacent the fishing hook for fishing.

12. The fishing lure of claim 11, wherein said first stretchable collar is spaced apart from said second stretchable collar, where said first hole of said first stretchable collar is aligned with said second hole of said second stretchable collar.

13. The fishing lure of claim 11, wherein the live bait is a worm, whereby a first portion of the worm is held by the first hole of the first stretchable collar, and a second portion of the worm is held by the second hole of the second stretchable collar.

14. A fishing lure for securing a live bait comprising:
- a flexible main body with a buoyant insert positioned inside, said flexible body is configured to retain a fishing hook inserted therethrough; and
- a stretchable collar connected to said flexible main body;
- said stretchable collar having a hole configured to stretch when pulled to allow the live bait to be inserted into said hole and constrict when released to secure said live bait in said hole;
- wherein said stretchable collar includes a top gripping portion on an opposite end of the stretchable collar from the flexible main body, where the hole of the stretchable collar is positioned between the top gripping portion and the flexible main body, said top gripping portion is configured to be pulled for stretching the hole for inserting and removing the live bait;
- whereby, when said flexible main body is positioned on the fishing hook and the live bait is inserted into the hole of the stretchable collar, said stretchable collar positioning the live bait adjacent the fishing hook for fishing and the buoyant insert maintaining the fishing lure on top of water during fishing with the live bait.

15. The fishing lure of claim 14, wherein the buoyant insert is an expanded polystyrene foam material.

16. The fishing lure of claim 14, wherein the live bait is a cricket, whereby the buoyant insert positioned inside the flexible main body is configured to maintain the cricket on top of water during fishing.

17. A fishing lure for securing live bait comprising:
- a flexible main body configured to retain a fishing hook inserted therethrough;
- a first stretchable collar connected to said flexible main body having a first hole configured to stretch when pulled to allow the live bait to be inserted into said first hole and constrict when released to secure a first portion of said live bait in said first hole;
- wherein said first stretchable collar includes a first top gripping portion on a first opposite end of the first stretchable collar from the flexible main body, where the first hole of the first stretchable collar is positioned between the first top gripping portion and the flexible main body, said first top gripping portion is configured to be pulled for stretching the first hole for inserting and removing the live bait;
- a second stretchable collar connected to said flexible main body having a second hole configured to stretch when pulled to allow the live bait to be inserted into said second hole and constrict when released to secure a second portion of said live bait in said second hole;
- wherein said second stretchable collar includes a second top gripping portion on a second opposite end of the second stretchable collar from the flexible main body, where the second hole of the second stretchable collar is positioned between the second top gripping portion and the flexible main body, said second top gripping portion is configured to be pulled for stretching the second hole for inserting and removing the live bait;
- whereby, when said flexible main body is positioned on the fishing hook and the live bait is inserted into the first hole of the first stretchable collar and the second hole of the second stretchable collar, said first and second stretchable collars positioning the live bait adjacent the fishing hook for fishing.

18. The fishing lure of claim 17, wherein said first stretchable collar is spaced apart from said second stretchable collar, where said first hole of said first stretchable collar is aligned with said second hole of said second stretchable collar.

19. The fishing lure of claim 17, wherein the live bait is a worm, whereby a first portion of the worm is held by the first hole of the first stretchable collar, and a second portion of the worm is held by the second hole of the second stretchable collar.

* * * * *